Jan. 7, 1947.  D. G. FAWKES  2,414,032
VALVE ACTUATING MEANS
Filed Aug. 4, 1943  6 Sheets-Sheet 1

Inventor:
Donald G. Fawkes
By Joseph O. Lange, Atty.

Jan. 7, 1947.     D. G. FAWKES     2,414,032
VALVE ACTUATING MEANS
Filed Aug. 4, 1943     6 Sheets-Sheet 2

Inventor:
Donald G. Fawkes
By Joseph O. Lange
Atty.

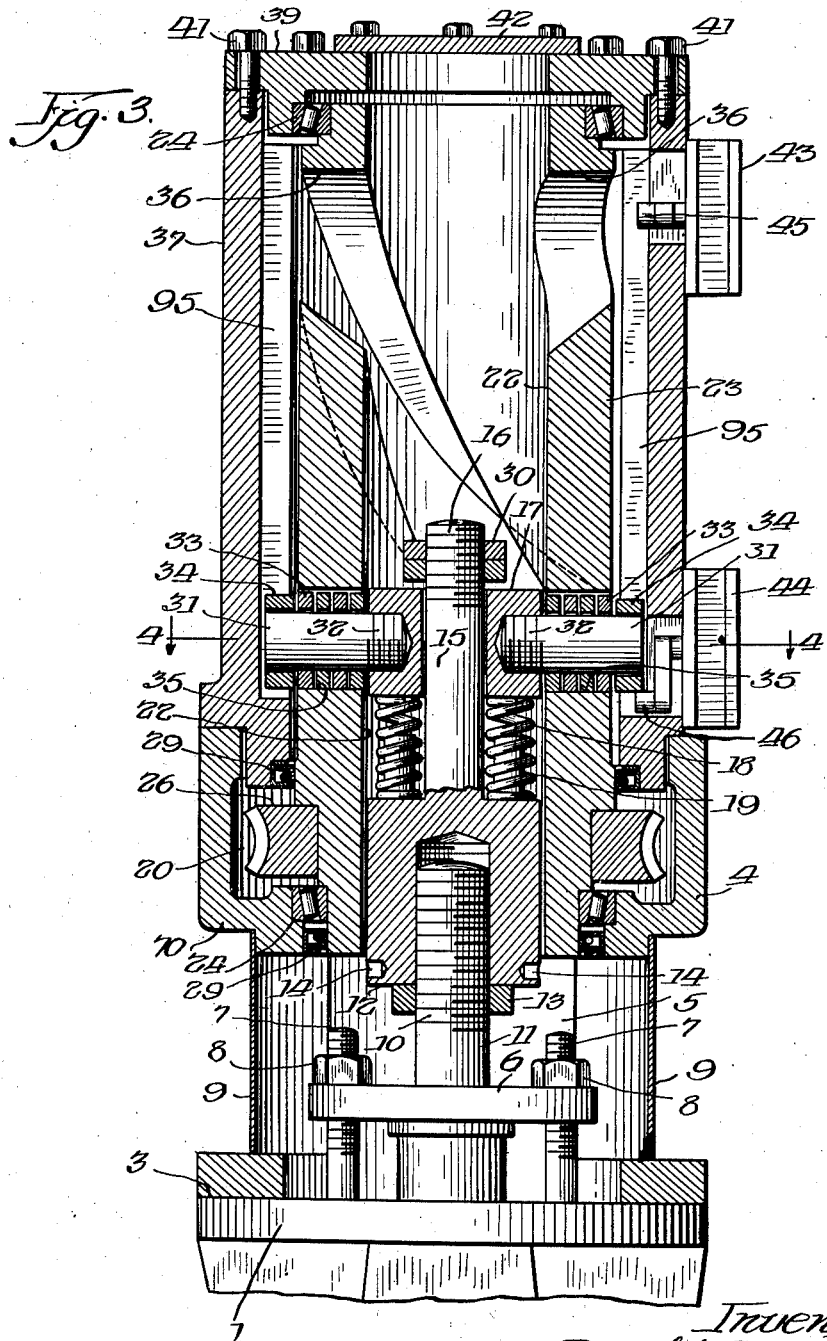

Jan. 7, 1947.  D. G. FAWKES  2,414,032
VALVE ACTUATING MEANS
Filed Aug. 4, 1943  6 Sheets-Sheet 4
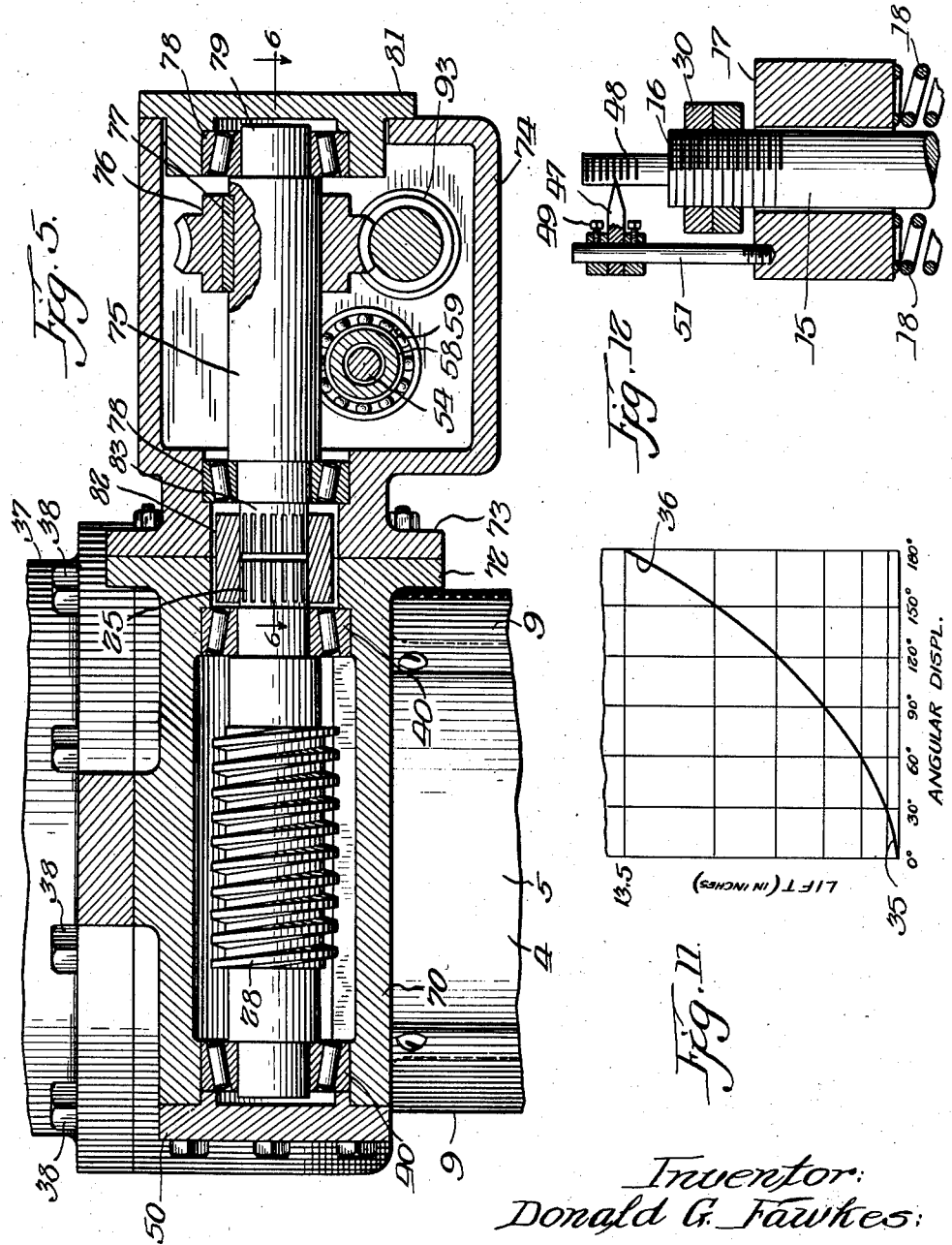
Inventor:
Donald G. Fawkes
By Joseph O. Lange Atty.

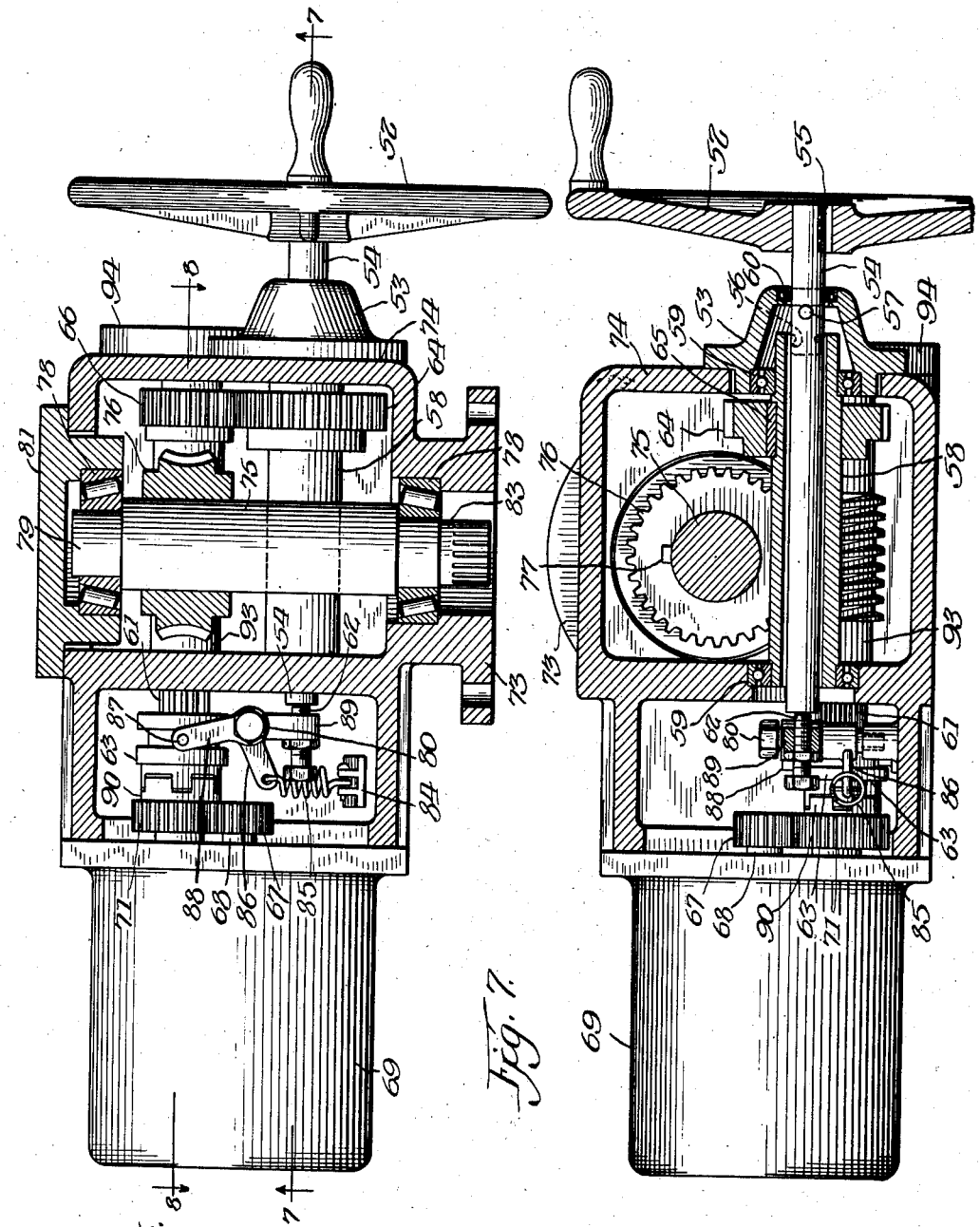

Jan. 7, 1947.  D. G. FAWKES  2,414,032
VALVE ACTUATING MEANS
Filed Aug. 4, 1943  6 Sheets-Sheet 6
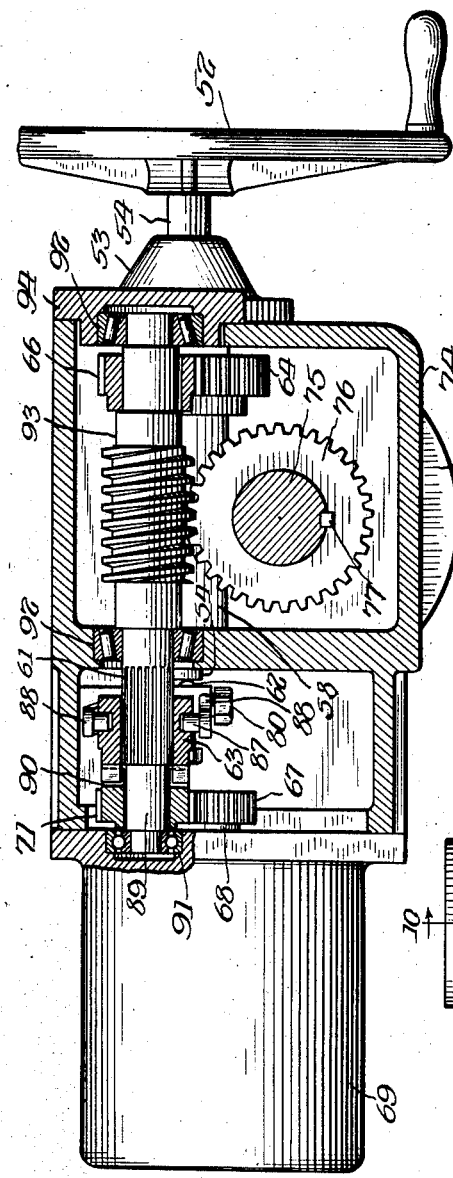
Inventor:
Donald G. Fawkes
By Joseph O. Lange
Atty.

Patented Jan. 7, 1947

2,414,032

UNITED STATES PATENT OFFICE 2,414,032

VALVE ACTUATING MEANS

Donald G. Fawkes, Chicago, Ill., assignor to Crane Co., Chicago, Ill., a corporation of Illinois Application August 4, 1943, Serial No. 497,411

10 Claims. (Cl. 192—143)

This invention relates to valve actuating means or the like. More especially it relates to a novel form of valve operator capable of being either manually or motor operated to obtain the desired quick opening and closing movement of a valve or similar mechanism. The motor operation referred to may employ either fluid or electric drive means, the electric drive being described herein.

An important object of the present invention broadly is to provide a valve operating mechanism in which the thrust-lift characteristic thereof may be exactly matched to the thrust-lift characteristic of the valve to which the operator is applied.

A further object is to provide a power driven valve actuating means in which the motor is enabled to gain momentum under relatively low torque loading when initially started from the valve seated position.

Another object is to provide a valve actuating means in which only a relatively small minimum amount of head room is required notwithstanding that the valve lift itself may be substantially large.

A further object is to provide a valve actuator in which optional means for manual actuation may be employed with positive means for declutching the motor drive preliminary to effecting such manual actuation.

Another important object of this invention is to provide a valve operating mechanism or the like in which the opening or closing of the valve may be speedily accomplished in approximately 180 degrees of actuator rotation or even less, and in which comparatively simple switch means may be used to control the opening and closing movements of the valve at each end of the travel or an intermediate position thereof.

Another important object is to provide a construction of the character described in which a barrel-cam or similar cylindrical form may be employed and in which the cam surface thereof is made with relatively slight inclination and greater lifting power to unseat the valve initially and with a further developed cam surface section of relatively increased slope or inclination to provide subsequently for accelerated longitudinal movement of the valve stem. Heretofore whenever it has been necessary to provide a valve actuating means in which the opening and closing of the valve could be accomplished in approximately 180 degrees or less it has been necessary to use a structure in which relatively greater head room is necessary. Similarly, this invention has acomplished the desirable advantage of providing that a graph of the valve lift plotted against the angular displacement of the cam is a smooth curve, which may initially be given any reasonable form desired by sloping the cam tracks to suit.

Other important objects and advantages will become more readily apparent upon proceeding with the specification read in light of the drawings, in which Fig. 1 is a plan exterior view of an assembly embodying my invention.

Fig. 3 is a fragmentary sectional view taken on the line 3—3 of Fig. 1.

Fig. 5 is a slightly magnified fragmentary sectional view taken on the line 5—5 of Fig. 2.

Fig. 6 is a longitudinal partly sectional view taken on the line 6—6 of Fig. 5.

Fig. 7 is a partial sectional view taken on the line 7—7 of Fig. 6.

Fig. 8 is a partly sectional view taken along the line 8—8 of Fig. 6.

Fig. 9 is a reduced exterior view of the novel cam forming a part of my invention.

Fig. 10 is a reduced sectional view taken on the line 10—10 of Fig. 9.

Fig. 11 is a typical graph showing how the lift of a valve embodying my invention may vary with the angular displacement of the operating cam.

Fig. 12 is a view of a novel stem load indicator constituting a part of my invention.

Similar reference characters refer to similar parts throughout the several views.

Figures 1, 4:
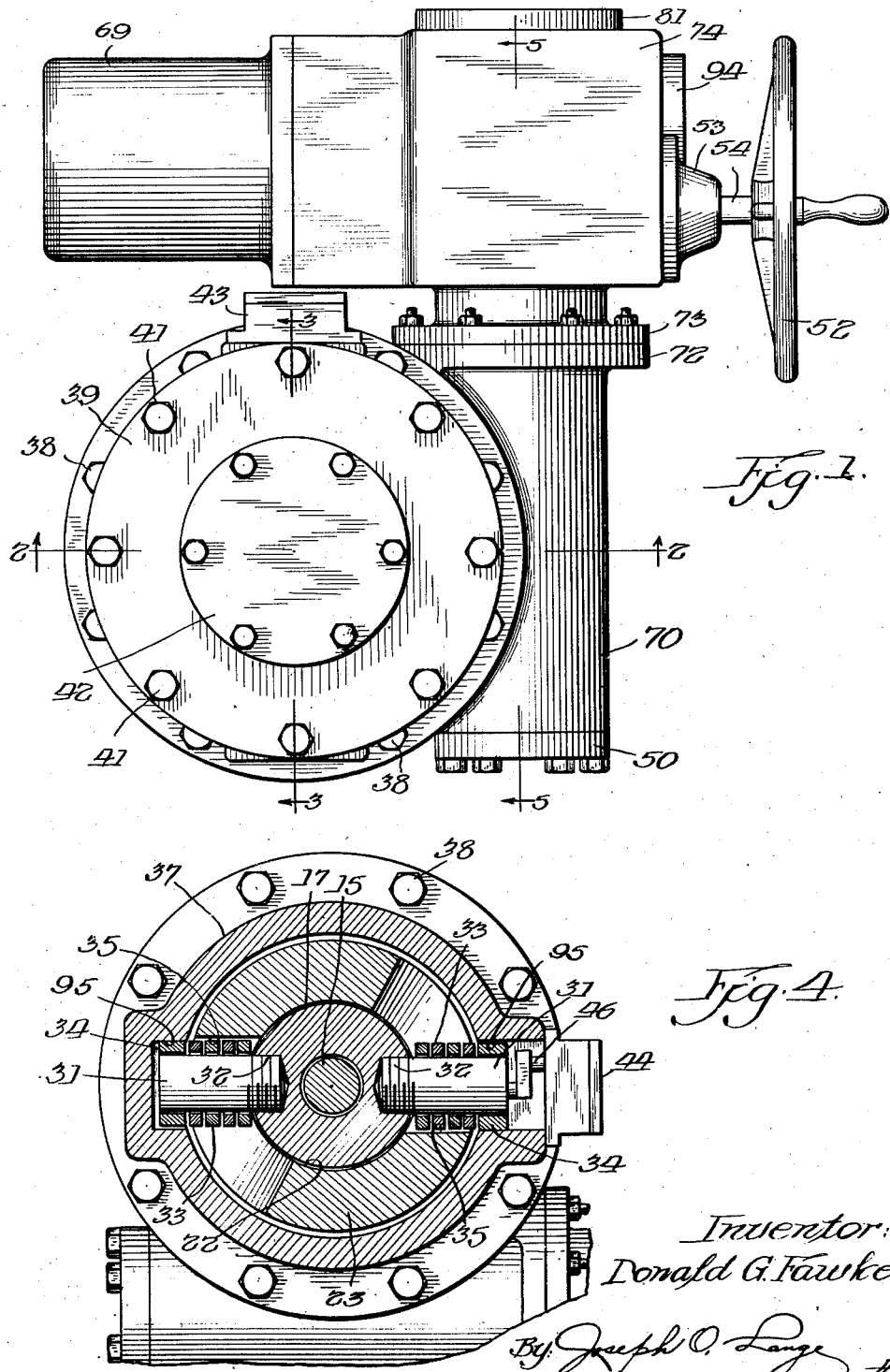
Fig. 4 is a sectional view taken on the line 4—4 of Fig. 3.

At the outset, it should be clearly understood that while the description hereinafter set forth is primarily concerned with the application of this novel actuating means to a valve, it is obvious of course that it is capable of being applied to any other form of mechanism or device in which the ultimate reciprocating motion of a shaft is similar to that found in a valve. As shown more clearly in Fig. 2, the numeral 1 designates the upper fragmentary flanged portion of a valve bonnet to which the unit is applied and attached by means of the usual bolts 2, forming the bolted flange joint therewith as indicated at 3. As a convenient means for applying the invention to a valve, the actuator is provided with the upright generally cylindrically formed housing 4 having the interrupted wall portions 5 whereby the usual valve packing flange 6 may be suitably packed and adjusted by means of its conventional bolts 7 and the nuts 8. As indicated at 9 in Fig. 3, a suitable enclosure or cover may be provided if desired in order to keep out dust and the like. The reciprocably movable valve stem 11 at its lower portion is connected to the usual valve closure member or disc (not shown) which may be either of the gate or globe type and which, upon suitable actuation, functions to open or close the valve, as desired. The stem 11 is threaded at 10, as indicated, to provide a suitable connection with the follower 12, the latter member being held securely in position thereon by means of the lock nut 13. The spaced apart recesses 14 at the lower portion of the follower 12 are preferably used for conveniently gripping and positioning the follower when it is being assembled with the valve stem 11.

Figure 2:
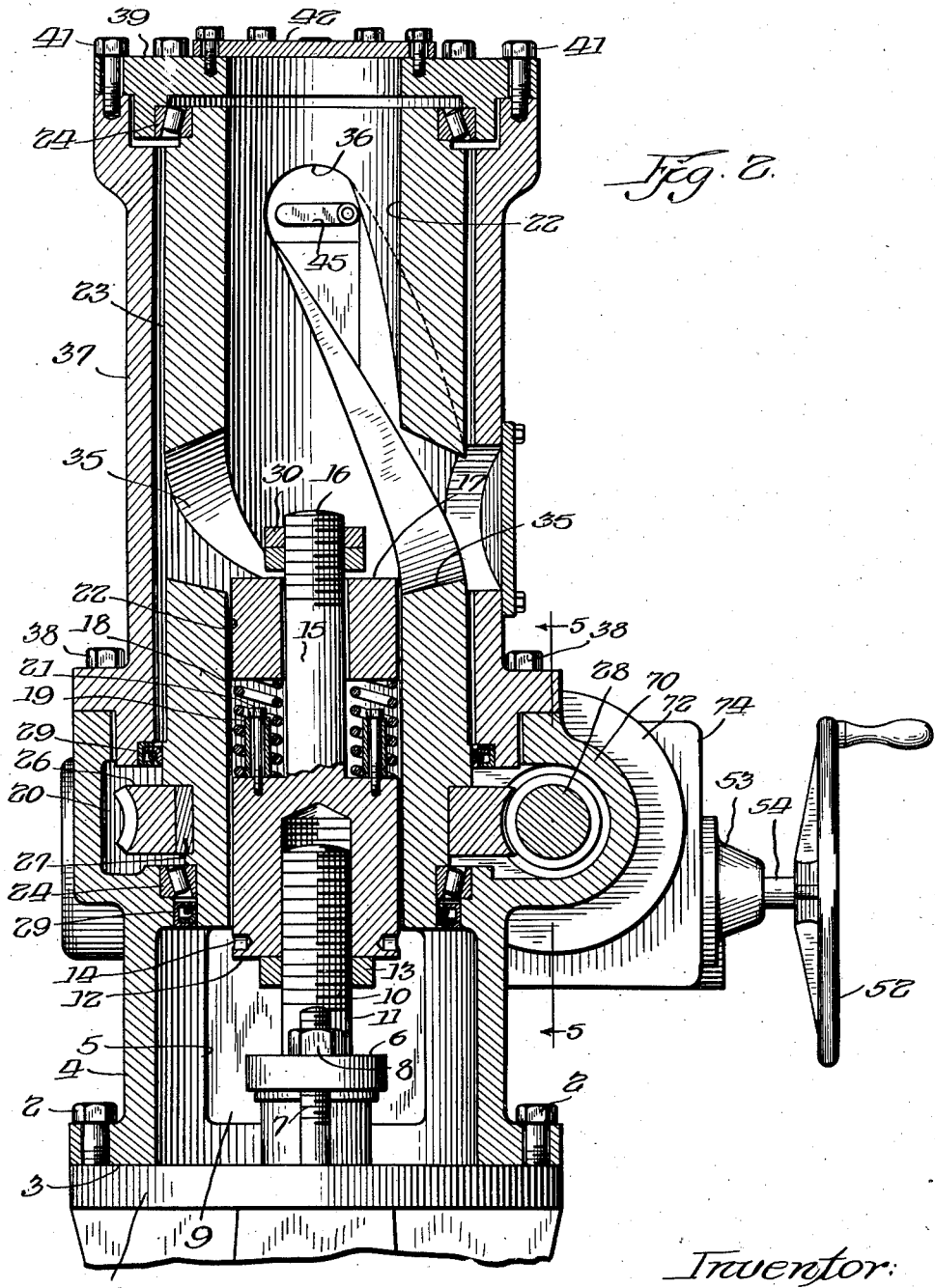
Fig. 2 is a fragmentary sectional view taken on the line 2—2 of Fig. 1.

As shown in Fig. 2, the follower 12 at its upper portion is provided with the preferably integral shank or extension 15, threaded at its upper portion, as indicated at 16, to allow for the mounting thereover of the centrally apertured upper member or crosshead 17, the latter being of substantially the same diameter as the lower follower portion 12. It should be noted that before the assembly is made of the crosshead 17 with the follower 12, the coil springs 18 are placed therebetween over the center guides 19 which are held in place by means of the bolts 21 or other suitable means. As will hereinafter be more greatly appreciated in considering the actual operation of the device, the springs 18 in addition to absorbing a substantial portion of the impact encountered when starting the valve closure in its closing direction or stopping it in its opening direction, also function more importantly in determining the proper seating load for the valve when the latter is being closed. The follower member 12 and the crosshead 17, as indicated, fit relatively snugly within the bore 22 of the barrel-cam generally designated 23. The cam is rotatably and non-reciprocably mounted upon the bearings 24 at its upper and lower end portions respectively. At its lower end the barrel-cam 23 cooperates with suitable means for effecting such rotation. The latter means consists of the worm wheel 26 which is keyed in non-rotatable relation to the barrel-cam by means of the pin 27, the worm wheel 26 rotatably operating within the upper chambered portion 20 of the housing 4, as indicated. To provide for the latter mentioned rotation the worm wheel 26 is in geared engagement with the worm 28 shown in transverse section in Fig. 2, the latter member being suitably connected, as hereinafter described, to a prime mover such as an electric motor or the like, and selectively to a means for rotating the same manually. In order to prevent the escape of such lubricant as may necessarily be contained within the chamber 20, suitable oil seals at 29 are preferably provided above and below the worm wheel.

As will hereinafter become apparent, in order to effect the desired reciprocal movement of the valve stem 11 in opening and closing the valve, rotary motion of the barrel-cam 23 must be accomplished. Such rotation is obtained, as shown more clearly in Fig. 3, by providing the upper portion 17 of the follower 12 with a pair of transversely extending axles 31 threadedly attached, as indicated, by means of the threads at 32. Each axle is provided with a plurality of rollers 33, cooperating with the cam tracks, and an additional roller 34 cooperating with the longitudinal tracks 95 in the upper housing 37. The rollers 33 are movable, during the seating movement of the valve, upon the uppermost surface 36 of the cam track. Thus, during the unseating movement of the valve, the rollers 33 ride on the lowermost surface 35 of the cam track. The detailed development of these cam surfaces is more clearly shown in Fig. 9 in which it will be noted that the barrel-cam 23 is provided with a pair of diametrically opposite identical spiral tracks or slots extending over and preferably projecting through the peripheral wall of the cylindrical portion defining the outside limits of the barrel-cam. Thus the cam 23 extends axially parallel with the valve stem 11 to provide upon its rotation for the longitudinal movement of the valve stem 11 by the movement of the rollers 33 upon the cam tracks which are preferably 180 degrees apart and which provide for the ascent or descent of the rollers simultaneously, depending upon the direction of rotation of the cam. At the upper end portion of the cam it will be apparent that the angle of inclination of slots approaching 36 is relatively large while at the lower end the slope of the cam surfaces approaching 35 is relatively small. The object and advantages of such arrangement of the spiral tracks or cam surfaces as just referred to will become more readily apparent by noting in the graph shown in Fig. 11 that the curve of angular displacement versus the lift is desirably smooth and that the slope of the curve varies from almost zero at zero lift to an angle of approximately 60 degrees at maximum lift, corresponding respectively to the cam surface portions 35 and 36 referred to. This arrangement provides for the maximum unseating effort to be applied by the cam at the initial unseating of the valve and afterward allowing for the accelerated movement of the valve during the larger portion of its lift when relatively little effort is required. Similarly when the valve is being closed the larger amount of the closing movement takes place rapidly on the steep incline of the track and then permits the portion 35 of the track inclined only slightly from the horizontal plane to exert substantially greater effort in seating the valve which is obviously beneficial considering seat tightness.

It is, of course, obvious that in certain applications, depending upon the nature of the installation involved, it may be desirable to divide the cam tracks into two sections, that is, one of small slope for the proper amount of movement to unseat the valve and another section of relatively greater slope to provide for the remainder of the valve stem travel. It will be appreciated that such arrangement is desirable because in opening a valve it is well known that considerably greater torque is required to lift and break the valve away from its seat primarily because of disturbing the inertia of the mass closure assembly and, secondly, because of the sticking action of a valve such as a gate, for example, when it is seated. Thus in the ordinary conventional type of operating mechanism the torque varies greatly from the seated position to the open position with the result that the prime mover is lightly loaded during the greater part of the valve travel and is not called upon to furnish the full power of which it is capable. It will be apparent that the present invention enables the thrust output of the operating unit at all lifts or degrees of valve opening to be matched to the thrust requirements of a valve simply by installing a cam having the properly sloped tracks, so that a substantially constant cam torque is required regardless of the position of the valve closure member. The latter condition is highly desirable for the reason that the motor is also subjected to a constant torque load, which not only permits the use of a simpler, less expensive motor, but also reduces the time required to operate the valve from one extreme position to the other. As shown in the instant illustration, it is desirable generally to design the barrel-cam for a rotational range of 180 degrees from the closed to the open position of the valve but, similarly, a greater or less amount of rotation may obviously be advantageous for some applications.

With further reference to Fig. 11, mention is made that the valve operator selected for illustrative purposes only has a maximum stroke (valve lift) of 13½ inches. The graph indicates the preferred range of degrees of rotation of the barrel-cam particularly illustrating that the amount of lift actually accomplished during the first thirty degrees of rotation is relatively slight as compared with the lift between 30 and 60 degrees, increasing the lift as the rotation moves between 60 and 90 degrees, and continuing to increase the rate of lift when the valve opening movement reaches its maximum limit.

It will be recognized that this graph is presented for the purpose of illustration only, and that it is possible to obtain practically any curve desired. In fact, it is desirable in some cases to incorporate a period of decreasing slope from say 150 degrees to 180 degrees in order to decelerate the disc and stem as they approach the extreme open position. This sort of arrangement will prevent shock loading of the operator mechanism and the valve when the latter is operated at very high speed.

The barrel-cam mechanism assembly thus described is preferably enclosed within a cylindrical housing 37 suitably supported and connected to the lower housing 4 by means of the bolts 38. At the upper limit of the housing 37, the cap 39 is applied, serving also as a means for guiding the inner bearings 24 as indicated, and being attached to the upper housing 37 by means of the bolt 41. The cap 39 may either be made integral or else, as shown, may be provided with a smaller supplementary inspection cap or handhole cover 42 useful when it is desired either for inspection, or to make the load adjustment of the combined jam nut 36, or in adjusting the limits switch as hereinafter described.

It will be apparent, as more clearly illustrated in Fig. 4, that the crosshead 17 reciprocably movable within the bore 22 of the cam 23 carries the rollers 33 on diametrically opposite axles 31. Transverse motion of the axles is prevented by the engagement of the rollers 34 at the outer end portions thereof with grooves 95 on either side of the housing as shown in Fig. 4, thus permitting the longitudinal movement of the stem, follower and crosshead while inhibiting rotation of the crosshead. Thus as the cam is rotated the crosshead rollers 33 move upon the cam surfaces 35 and 36 to thereby move the follower and crosshead axially. The plurality of rollers moving in the cam tracks reduce the friction losses which would otherwise occur due to the variations in surface speed from the inner to the outer diameter of the cam and also provide for carrying bearing loads more uniformly.

It will be apparent that the gearing arrangement thus far described is operative also under conditions of manual operation as well as being motor driven, either by fluid motors or electrical motors. In the latter connection it is desirable that some means for limiting or stopping the motor at either end of the valve travel or at a predetermined location should be provided. This result is accomplished by means of the upper and lower limit switches 43 and 44 respectively, shown schematically in Fig. 3, positioned at either end of the valve travel as indicated. The closing limit switch 44 provides that the motor circuit is opened when the cam roller reaches or closely approaches the extreme closed position, that is when the follower 12 is at or near the lowest point of its travel. The opening limit switch 43 will be arranged to trip when the valve closure member approaches its full open position. Obviously the limit switches shown may be actuated either by numerous means, as for example, by the follower, as indicated herein, tripping the levers 45 and 46 respectively, or by use of an auxiliary cam or cams cooperating with the main barrel cam. The main worm shaft or other rotating member may likewise be employed to accomplish such limit switch actuation.

As shown in Figs. 2 and 5, the housing 4 at its upper portion is provided with an integral side chambered portion 70 which, as shown more clearly in Fig. 5, extends substantially horizontally and axially parallel therewith to enclose the worm 28 for its full length, the latter member being journaled in the end bearings 40 at each end thereof. The front end portion of the extension housing 70 is capped by means of the end flange 50 bolted thereto as indicated. The opposite end of the housing 70 is provided with a flanged portion 72 with a central aperture and provided with the bolt means, as indicated, for attachment to a suitable gear housing 74 to serve as the medium for providing either manual or motor operation as hereinafter explained. A splined coupling 82 serves to connect the end portion of the worm 28 with the shaft 75 upon which is non-rotatably mounted the worm wheel 76 restrained against rotation by means of the key 77. The shaft 75 is similarly mounted against endwise movement by means of the bearings 78 at each end. At the opposite end portion thereof the housing 74 is provided with the closure cap 81 bolted in the usual manner and as described in connection with the housing 70 to guide the shouldered portion 79 of the shaft 75. The worm wheel 76 is in geared engagement with the worm 93, the latter member, as hereinafter described in greater detail, being directly but disengageably mounted relative to the motor drive and the handwheel for providing the selective means of operation previously referred to and described hereinafter at greater length.

In considering the additional function of the load compensating springs 18, as previously referred to, it may be desirable to employ in cooperation therewith what is termed a stem load indicator cooperating with the crosshead 17 and the shank 15 of the follower 12, as shown more clearly in Fig. 12. By the arrangement shown an accurate determination may be made as to just how much axial load is applied to the stem when the crosshead 17 is at its lowermost position. The indicator consists of a rod 51 threaded into the top of the crosshead 17 and upon which is removably mounted the pointer 47 which extends toward the graduated rod 48 threaded into the top of the shank 15 of the follower 12. To facilitate installation of the operating unit on the valve as hereinafter described and to permit adjustment of the pointer when necessary due to any relaxation that may take place in the springs, the pointer 47 is held on the rod 51 between two collars which are locked in place by means of setscrews 49. Also, by this means the pointer can be swung out of the way when the jam nuts 30 are being adjusted, without changing the setting of the load indicator.

Specifically, in installing the mechanism on a valve, demounting of the pointer 47 and the associated collar members from the rod 51 permits removal of the jam nuts 30, after which the follower 12 together with the springs 18 may be removed from the unit. The follower 12 may then be threadedly attached onto the end of the valve stem 11 after which the unit may be slid over the follower and bolted in place on the valve. The jam nuts 30 and the indicator pointer 47 are then reinstalled and the handwheel 52 is turned clockwise until the crosshead 17 rests against the upper ends of the springs 18 at which time the load indicator described in connection with Fig. 12 may be adjusted to read zero load. The handwheel is then turned to the extreme closed position and the load indicator is observed; if the indicated seating load is higher or lower than that desired, the handwheel is turned until the spring load is relieved, after which the spring compression may be adjusted in whichever direction is required by screwing the follower 12 up or down on the valve stem and locking it in place by means of the lock nut 13. Thus, when the proper seating load has been obtained, the handwheel is turned until the load indicator shows the desired pre-load on the springs, then the lower jam nut is screwed down against the follower 12 and locked by means of the upper jam nut 30 as shown.

It is desirable when providing a device of this character with joint means for manual operation and motor actuation to provide positive means for greater safety when the device is manually operated. Specifically, this is accomplished by providing an automatic means whereby the handwheel is normally disengaged in order to insure the maximum safety for the operator of the manual means.

With reference to the detailed description and operation of the declutching mechanism, it should be noted, as shown more clearly in Figs. 6 and 7, that the castle clutch between the motor 69 and the gears within the gear housing 74 comprises the upper longitudinally movable collar 63 and the lower axially fixed portion 90, the collar portion 63 being engaged by the arms 88 of the disengaging lever, the latter having the pins 87 to fit within the groove of the collar 63 as indicated. The pair of angularly extending arms 88 is pivotably movable upon the bolt 80 which, as more clearly shown in Fig. 7, is threaded into a boss on the inner wall of the end housing to which the motor 69 is attached. The arm 88 is held in spring-loaded relation to thereby normally maintain the clutch in engaged position by means of the coiled spring 85, one end thereof being attached to the angle lever 86 and the other being mounted upon the lugs 84 attached within the housing, as shown. It will therefore be apparent that upon depressing the handwheel stem 54 within the sleeve 58, the adjustable stop bolt 62 will likewise be moved inwardly by such movement of the handwheel, causing the angle arm 88 to be moved upwardly and to thereby lift the castle clutch portion 63 from engagement with the lower portion 90. Such clutch action permits the handwheel 52 to be operated, as hereinafter explained, thereby rotating the gear 64 engaging the pinion 66. Such rotation in turn causes the worm gear 93 to rotate the worm wheel 75 and the worm 28 (Fig. 5). Since the worm 28 is in geared engagement with the worm wheel 26 non-rotatably attached to the barrel-cam 23, as shown more clearly in Fig. 2, the latter member will then be caused to rotate to either open or close the valve as desired and as previously explained.

As to the motor operation, it will be apparent that as soon as manual operation is ceased the castle clutch portion 63 under the influence of the spring 85 will immediately engage its fixed lower portion 90. As shown more clearly in Fig. 6, the motor shaft 68 is directly connected to the gear 67, meshing with the gear 71 which is integral with the lower portion of the clutch 90. Thus, upon rotation of the gear 71 as driven by the motor 69, the worm 93 having the splined shaft 61 connected through the declutching device will be caused to rotate and thereby effect similar rotation of the worm wheel 76. The latter member mounted non-rotatably upon the shaft 75 is suitably connected by means of the coupling 82 (Fig. 5) to the journaled worm 28 and, as described in connection with the hand operation, will cause rotation of the worm wheel 26 mounted within the chamber 20 to thereby rotate the barrel-cam in the desired direction to lift or to reseat the valve. As explained in connection with hand operation this is accomplished by movement of the rollers 33 upon the cam tracks 35 upwardly to the limits defined by the cam surfaces 36 thus quickly effecting maximum lift to the valve. The worm 93 is journaled against axial movement by means of the bearings 92 at each end thereof as shown in Fig. 8.

It will thus be apparent that insofar as possible injury to an operator is concerned, the mechanism herein described affords the maximum of safety, at the same time providing a thrust-lift characteristic exactly matched to the thrust-lift characteristic of the valve to which it is applied and the form may of course vary in accordance with details, depending upon the type of valve and the character of service for which the valve is designed.

It will thus be appreciated that the operation of my mechanism provides that the clutch is normally engaged so that the motor is connected to the barrel cam through one set of helical gears and two sets of worm gears. When hand operation is desired, the handwheel is pushed inwardly along its stem axis thus declutching the motor as hereinabove explained, and by continuing to push inwardly on the handwheel and rotating it at the same time the handwheel clutch may be engaged by means of the pin 57 interlocking with the slot 56. Therefore, so long as torque is applied to the handwheel to rotate the same, the handwheel clutch will remain engaged. When the handwheel is released it will be apparent that it is automatically disengaged from the valve shaft and permits the re-engagement of the motor. In large sizes of valve actuating mechanisms it may be desirable to incorporate a lever to facilitate shifting of the handwheel shaft. As shown in Fig. 7, the handwheel 52 is reciprocably movable within the bearing escutcheon 53, the handwheel stem 54 extending therethrough being locked in non-rotatable relation to the handwheel by means of the pin 55. In the position shown, the handwheel clutch is disengaged, as indicated at 56 in dotted lines; the pin 57 is out of engagement therewith. However, it is apparent that upon depressing or moving the handwheel downwardly, the pin 57 engages the slot 56 of the sleeve 58, the latter member being journally mounted within the upper and lower bearings 59 of the housing. Immediately upon moving the handwheel stem 54 inwardly it also causes the adjustable stop screw 62 against which it abuts to be depressed and to thereby lift the castle clutch 63 of the motor drive to thereby disengage the same from the motor. Thus the gear 64 in Fig. 7 which is pinned to the sleeve 58 by means of the key 65 thereupon rotatably engages the pinion 66 in Fig. 6 to drive the worm 28 and cause the gear 26 of the barrel-cam 23 to be rotated. Hand operation is thereby effected without being connected with the motor drive. Immediately upon releasing the handwheel it will automatically disengage itself and the castle clutch 63 immediately becomes re-engaged. In the case of the motor actuation the central gear 67 mounted upon the motor shaft 68 of the motor 69 is suitably rotated immediately upon the motor drive becoming effective thereby causing the gear 71 to drive through the splined shaft 61 through the clutch portion 63 now in engaged position to rotate the worm 28 in mesh with the cam gear 26.

Thus it is apparent that numerous details of the construction may be varied throughout a wide range without departing from the principles disclosed by this invention, and I, therefore, do not propose limiting the invention otherwise than as necessitated by the prior art as viewed in light of the appended claims.

I claim:

1. A valve actuating mechanism or the like, the combination included driving means, driven means, cam means interposed between said driving means and said driven means, the said cam means including a rotatable barrel-cam journaled for rotational and non-axial movement and having a pair of substantially spiral tracks oppositely disposed and ascending in the same direction, the incline of the tracks at the upper end of the said cam being relatively greater than at the lower end thereof, whereby the inertia of the member to be driven is overcome by the application in the said drive means of a larger initial effort.

2. A valve actuating mechanism, the combination including driving means, driven means, the said latter means including cam means in engagement with said driven means, the said cam means including a barrel-cam journaled for rotational and non-axial movement and having spiral tracks substantially 180 degrees apart and ascending in the same direction, the slope of the tracks at the upper end of the cam being relatively great while at the lower end thereof the slope is relatively small, a follower resiliently mounted member including a crosshead fitting within the bore of the said cam for actuating the valve, rollers on the said crosshead disposed on diametrically opposed axles, axially disposed guide means provided in a housing for the driven means, means on the crosshead engaging said guide means to provide axial and non-rotational movement of the crosshead, whereby upon rotation of the said cam the rollers of the said follower member are caused to ride upon the tracks of the said cam.

3. A geared actuating mechanism, the combination including driving means, driven means therefor optionally power or hand driven, cam means in engagement with said driven means, the said cam means including a substantially hollow cylindrical cam journaled for rotational and non-axial movement and having spiral cam surfaces annularly arranged upon it, cam follower means guided for axial and non-rotational movement for actuation by the cam surfaces of the said cam, and means actuated by said cam means for cutting out the power driven means upon predetermined movement of the said cam means.

4. A valve actuating mechanism, the combination including driving means, driven means, a housing therefor, cam means between said driving means and said driven means, the said cam means including a rotatable and non-axially movable barrel-cam having spiral surfaces ascending in the same direction, a combined follower and crosshead within the cam mounted in resilient relation to each other, a plurality of rollers carried by the said crosshead, the latter member being non-rotatably mounted by engagement with a portion of the said housing.

5. A valve actuating mechanism or the like, the combination including driving means, driven means, a reciprocably movable shaft, cam means cooperating with said driving means and said driven means, the said cam means including a rotatable and non-axially movable barrel-cam having a pair of spiral surfaces oppositely disposed and ascending in the same direction, a follower member resiliently fitting within the said cam, rollers on the said follower member disposed on diametrically opposed axles to engage the surfaces of the said cam, whereby upon initial rotation of the cam the shaft is caused to move longitudinally at a predetermined speed and upon continued rotation of the cam at the same speed the shaft moves longitudinally in the same direction at increased speed.

6. A valve actuating mechanism, the combination including driving means, driven means, rotatable and non-axially movable cam means cooperating with the said driving means and said driven means, a longitudinally movable shaft therefor, the said cam means including a sleeve having spiral surfaces of varied pitch ascending in the same direction, a non-rotatable crosshead cooperating with the said sleeve and having means disposed on diametrically opposed extensions to engage the said sleeve, whereby upon rotation of the said sleeve the said crosshead means are caused to move upon the spiral surfaces of the said sleeve to move the said shaft.

7. A valve actuating mechanism, a motor, driven means including worm gears and helical gears, cam means driven by the said gears, the said cam means being journaled for rotational and non-axial movement and having spiral surfaces ascending in the same direction with varried pitch to provide increased lift, a crosshead having means for engagement of the said cam means, a longitudinally movable shaft cooperating with the said crosshead, adjustable resilient means between the said shaft and crosshead whereby the thrust-lift characteristic of the said actuating mechanism may be matched to the thrust-lift characteristic of the valve being actuated.

8. A valve actuating mechanism of the character described, the combination including a reciprocably movable shaft, driving means, driven means, the said driving means including motor and manual means optionally operable, declutching means therefor, cam means superposed between said driving means and said driven means, the said cam means including a barrel-cam journaled for rotational and non-axial movement and having oppositely disposed spiral surfaces ascending in the same direction to move said shaft longitudinally, the declutching means being normally engaged so that the motor means is connected to the said cam, whereby when manual operation is desired, the said manual means are depressed to declutch the said motor means and upon continued depression of the said manual means and subsequent rotation thereof the declutching means for the manual means becomes engaged.

9. A valve actuating mechanism, a motor, driving gears, driven gears, a reciprocably movable shaft, cam means actuated by said driven gears to move the said shaft, the said cam means including a sleeve cam journaled for rotational and non-axial movement and having cam surfaces oppositely disposed with varied pitch ascending in the same direction, crosshead means cooperating with the said cam to limit the movement of the said shaft, limit switch means for the said motor to open and close the valve, whereby the closing limit switch is actuated so that the motor circuit is opened when the cam approaches the closed position of the valve and the opening limit switch is actuated to open when the cam approaches the full open position of the valve.

10. Valve driving means, a reciprocably movable valve shaft, including driving gears, driven gears, a housing therefor, cam means in the housing including a barrel-cam journaled for rotational and non-axial movement and having oppositely disposed spiral surfaces, a load indicator on the said valve shaft, resilient means between the said shaft and the said cam whereby in cooperation with said load indicator the thrust-lift characteristic of the said driving means may be adjusted to the thrust-lift characteristic of the valve shaft.

DONALD G. FAWKES.